(12) United States Patent
Chaubey et al.

(10) Patent No.: US 12,298,876 B2
(45) Date of Patent: *May 13, 2025

(54) SYSTEMS AND METHODS FOR MANAGING POWER CONSUMPTION OF A DISTRIBUTED SYSTEM

(71) Applicant: Wells Fargo Bank, N.A., San Francisco, CA (US)

(72) Inventors: Mayuri Chaubey, Bangalore (IN); Rameshchandra Bhaskar Ketharaju, Hyderabad (IN); Sitara Kumbale, Bangalore (IN); Vinayak Sodar, Dharwad (IN); Manak Suri, New Delhi (IN); Ashutosh Verma, Bangalore (IN); Naveen Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,884

(22) Filed: Mar. 19, 2024

(65) Prior Publication Data

US 2024/0220386 A1 Jul. 4, 2024

Related U.S. Application Data

(63) Continuation of application No. 17/656,200, filed on Mar. 23, 2022, now Pat. No. 11,966,311.

(51) Int. Cl.
*G06F 1/32* (2019.01)
*G06F 1/30* (2006.01)
(Continued)

(52) U.S. Cl.
CPC ........ *G06F 11/3062* (2013.01); *G06F 1/3206* (2013.01)

(58) Field of Classification Search
CPC ................ G06F 1/3206; G06F 11/3062
See application file for complete search history.

(56) References Cited

U.S. PATENT DOCUMENTS 9,405,348 B2 8/2016 Jackson
10,165,228 B2 * 12/2018 Stephanson ............ G01D 18/00
(Continued)

OTHER PUBLICATIONS

Wireless Sensors Improve Data Center Energy Efficiency, U.S. Department of Energy Technology Case Study Bulletin, 8 pages, Sep. 2010.

(Continued)

*Primary Examiner* — Stefan Stoynov
(74) *Attorney, Agent, or Firm* — K&L Gates LLP

(57) ABSTRACT

Systems, apparatuses, methods, and computer program products are disclosed for managing operation of a distributed system that provides computer-implemented services. An example method includes collecting, via an out-of-band stream, sensor data from a plurality of temperature sensors positioned to infer temperatures of components of a distributed system. The example method further includes inferring, using the inferred temperatures, power consumption rates for performing respective actions with each of the components. The method further includes obtaining an action request and selecting, based on the inferred power consumption rates, a particular component of the components to perform an action to service the action request, the selection being made with a preference to reduce power consumption for performance of the action. The method further includes performing, with the particular component, the action to service the action request, the action resulting in updated computer-implemented services being provided by the distributed system.

20 Claims, 4 Drawing Sheets

(51) Int. Cl.
*G06F 1/3206* (2019.01)
*G06F 11/30* (2006.01)

(56) References Cited

U.S. PATENT DOCUMENTS

| | | |
|---|---|---|
| 10,555,189 B2 | 2/2020 | Rahman |
| 2009/0164852 A1 | 6/2009 | Purrington |
| 2009/0265568 A1 | 10/2009 | Jackson |
| 2014/0006815 A1 | 1/2014 | Castro-Leon |
| 2016/0054783 A1* | 2/2016 | Rajappa ............... G06F 9/4893 |
| | | 700/291 |
| 2021/0389994 A1* | 12/2021 | Malleni ............... G06F 9/5083 |

OTHER PUBLICATIONS

Theodore Makris, Measuring and Analyzing Energy Consumption of the Data Center, Masters Thesis Aalto University, 47 pages, Jul. 2017.

Laurens Versluis, A Holistic Analysis of Datacenter Operations: Resource Usage, Energy, and Workload Characterization Extended Technical Report, Vrije Universiteit Amsterdam, 34 pages, Jul. 2021.

* cited by examiner

SYSTEMS AND METHODS FOR MANAGING POWER CONSUMPTION OF A DISTRIBUTED SYSTEM

CROSS-REFERENCE TO RELATED APPLICATIONS

This application is a continuation of U.S. patent application Ser. No. 17/656,200, filed Mar. 23, 2022, the entire contents of which are incorporated herein by reference.

BACKGROUND

Distributed computing systems rely on infrastructure components distributed over a wide geographic area. Over time, these infrastructure components may change (e.g., through replacement, changes in drivers and/or firmware, etc.) and the workloads performed by the infrastructure components may also change. As the infrastructure components and workloads performed by the components change, the energy use profiles for completing workloads with the infrastructure components correspondingly change, presenting significant challenges in managing the distributed systems with respect to power consumption.

BRIEF SUMMARY

Managing power consumption in conventional implementations of distributed systems is further hindered because collecting energy consumption information directly from the infrastructure components may place additional workloads on the infrastructure components, or in some cases, may not be possible. Further, in distributed systems which include both private and public fundamental infrastructure components, trust issues may arise with respect to reporting mechanisms of the public components. For example, as operators of the public components may have an economic incentive to encourage continued use of their infrastructure components, this may lead to purposely misleading and/or inaccurate energy consumption reporting or other nefarious activities by the operators.

Systems, apparatuses, methods, and computer program products are disclosed herein for managing operation of a distributed system that provides computer-implemented services. In particular, embodiments disclosed herein provide improved power consumption management in a distributed system by integrating sensors with various infrastructure components. The sensors may, for example, measure temperatures of the infrastructure components over time to infer power consumption (e.g., at a component level, unit level, or other level of quantification) by the infrastructure components. The power consumption information may be correlated with workload data indicating various actions performed by hardware components of the infrastructure components to obtain a holistic view of power consumption by the infrastructure components when performing various types of tasks. In some embodiments, this holistic view may be utilized to determine which infrastructure components to utilize for different types of workloads, to determine whether to replace or modify the operation of various infrastructure components, and/or to make other types of decisions to reduce power consumption. Further, data from the sensors may be received through an out-of-band stream, thus ensuring secure and accurate temperature information of various infrastructure components and avoiding any potential discrepancies in the data.

In one example embodiment, a method is provided for managing operation of a distributed system that provides computer-implemented services. The method includes collecting, by communications circuitry of a system device, sensor data from a plurality of temperature sensors via an out-of-band stream, the plurality of temperature sensors being positioned to infer temperatures of components of the distributed system, and the sensor data comprising the inferred temperatures. The method also includes determining, by optimization circuitry of the system device and using the inferred temperatures, power consumption rates for performing respective actions of a plurality of actions with each of the components. The method also includes obtaining, by the communications circuitry, an action request for an action of the plurality of actions. The method also includes selecting, by the optimization circuitry and based on the determined power consumption rates, a particular component of the components to perform the action to service the action request, the selection being made with a preference to reduce power consumption for performance of the action. The method also includes performing, by the communications circuitry and with the particular component, the action to service the action request, the action resulting in updated computer implemented services being provided by the distributed system.

In another example embodiment, an apparatus is provided for managing operation of a distributed system that provides computer-implemented services. The apparatus includes communications circuitry configured to collect sensor data from a plurality of temperature sensors via an out-of-band stream, the plurality of temperature sensors being positioned to infer temperatures of components of the distributed system, the sensor data comprising the inferred temperatures. The communications circuitry is also configured to obtain action request for an action of a plurality of actions. The apparatus also includes optimization circuitry configured to determine, using the inferred temperatures, power consumption rates for performing respective actions of the plurality of actions with each of the components. The optimization circuitry is also configured to select, based on the determined power consumption rates, a particular component of the components to perform the action to service the action request, and the selection being made with a preference to reduce power consumption for performance of the action. The communications circuitry is also configured to, with the particular component, perform the action to service the action request, the action resulting in updated computer implemented services being provided by the distributed system.

In another example embodiment, a computer program product is provided for managing operation of a distributed system that provides computer-implemented services. The computer program product includes at least one non-transitory computer-readable storage medium storing software instructions that, when executed, cause an apparatus to collect sensor data from a plurality of temperature sensors via an out-of-band stream, the plurality of temperature sensors being positioned to infer temperatures of components of the distributed system, the sensor data comprising the inferred temperatures. The instructions, when executed, also cause the apparatus to determine, using the inferred temperatures, power consumption rates for performing respective actions of a plurality of actions with each of the components. The instructions, when executed, also cause the apparatus to obtain an action request for an action of the plurality of actions. The instructions, when executed, also cause the apparatus to select, based on the determined power consumption rates, a particular component of the components to perform the action to service the action request, the selection being made with a preference to reduce power consumption for performance of the action. The instructions, when executed, also cause the apparatus to perform, with the particular component, the action to service the action request, the action resulting in updated computer implemented services being provided by the distributed system.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
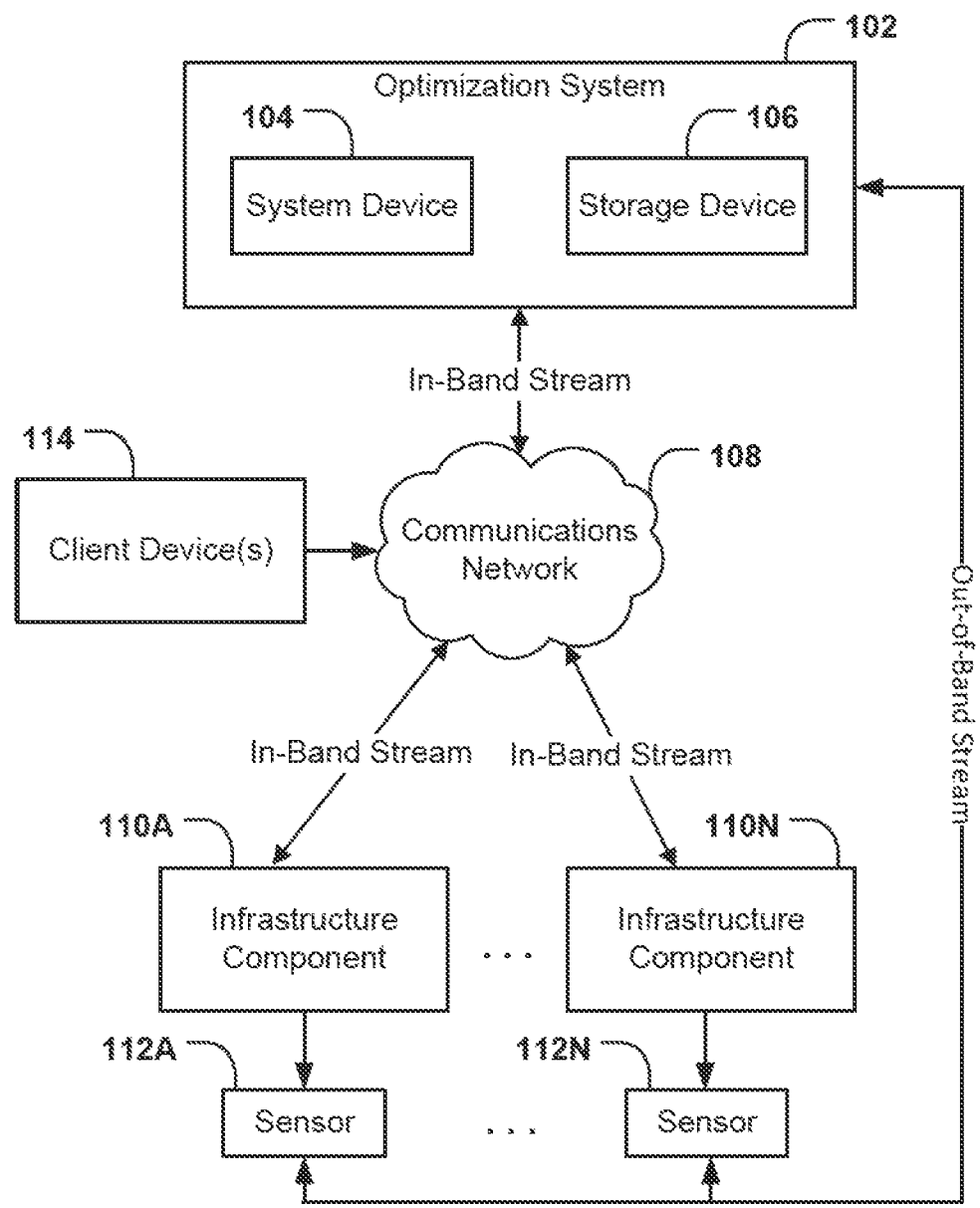
FIG. 1 illustrates a system in which some example embodiments may be used to manage operation of a distributed system that provides computer-implemented services.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The terms "computing device," "infrastructure component" and/or the like are used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices. In some embodiments, infrastructure components may comprise edge devices, such as routers, switches, and/or the like.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "sensor" refers to any type of sensor capable of capturing or inferring temperature data from infrastructure components. In some embodiments, a sensor may comprise a dedicated sensor coupled to a particular infrastructure component. In some embodiments, a sensor may comprise a thermal camera or the like that is capable of capturing thermal image data (e.g., a thermal map from which temperatures may be inferred) from a range of different devices, e.g., a camera positioned in an area that comprises multiple infrastructure components (e.g., a data room or the like). In some embodiments, sensors may be back-integrated into an existing distributed system. In some embodiments, a sensor may comprise pre-existing elements or functionalities of an infrastructure component which are reconfigured to provide temperature data (e.g., an onboard management controller reconfigured to provide desired sensor information over time and/or the like).

The term "sensor data" refers to data received and/or collected from one or more sensors. In some embodiments, sensor data may be received via an out-of-band stream. In some embodiments, sensor data may comprise inferred temperatures of one or more infrastructure components. Sensor data may also comprise other information such as identifiers of one or more infrastructure components associated with inferred temperatures, temporal information (e.g., timestamps) associated with inferred temperatures, geolocation information of one or more infrastructure components, information identifying a type of the sensor, and/or other information. In some embodiments, sensor data may be received and/or collected continuously in real-time.

The term "workload data" refers to data related to various actions performed by various infrastructure components of a distributed system. In some embodiments, workload data may be automatically recorded and stored as the various actions are performed by the various infrastructure components. Workload data may identify types of actions (e.g., query executions, data packet transmissions, searching and/or storing operations, and/or other actions). It is to be appreciated that an "action" may comprise any functionality capable of being performed by an infrastructure component. Workload data may comprise additional information such as identifiers of one or more infrastructure components associated with the workload data, temporal information (e.g., timestamps) associated with when actions of the workload data were performed, geolocation information of one or more infrastructure components, and/or other information. In some embodiments, workload data may also comprise configuration data of one or more infrastructure components used to perform actions associated with the workload (e.g., configuration files or other data indicating a configuration of hardware and/or software of the infrastructure component). In some embodiments, workload data may be received and/or collected continuously in real-time.

Overview

As noted above, methods, apparatuses, systems, and computer program products are described herein that provide for managing operation of a distributed system that provides computer-implemented services. Traditionally, it has been very difficult to manage power consumption of a distributed system, due to both the diverse nature of infrastructure components and the multitude of operators (e.g., companies or other entities) that may be associated with the infrastructure components. In this regard, there has been typically no way to ensure accurate power consumption reporting by various infrastructure components. Consequently, it is difficult to make correct decisions on how and where to execute various operations in a distributed system that will reduce and/or minimize energy consumption, and additionally, it is difficult to make decisions regarding actual usage of various infrastructure components (e.g., decisions regarding restarting components, modifying components, discontinuing use of a component, recognizing lifespan conclusion of a component, determining optimal geolocation for components, etc.).

In contrast to conventional techniques for managing operation of distributed systems, example embodiments described herein leverage sensor data and workload data to achieve a holistic, accurate view of the power consumption of a distributed system and components thereof. Embodiments herein leverage continuous, real-time collection of both sensor data from a sensor network of a distributed system and workload data associated with infrastructure components of the distributed system to achieve the holistic view of the distributed system. Embodiments may utilize the holistic view to determine optimal methods for executing actions and/or workloads within the distributed system with a prioritization towards reducing power consumption or maintaining a predefined power consumption level of the distributed system.

Accordingly, the present disclosure sets forth systems, methods, and apparatuses that provide improved power consumption management in a distributed system. There are many advantages of these and other embodiments described herein. For instance, through continuously correlating workload data with sensor data, embodiments herein provide a consistent and real-time view of power consumption taking place within a distributed system that allows for decisions to be made that reduce power consumption. In addition, by leveraging sensor data received via an out-of-band stream, embodiments herein avoid issues caused by poor power consumption reporting, bad actors and/or other potential security issues and ensure accurate temperature information.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, an optimization system 102 may include a system device 104 in communication with a storage device 106. Although system device 104 and storage device 106 are described in singular form, some embodiments may utilize more than one system device 104 and/or more than one storage device 106. Additionally, some embodiments of the optimization system 102 may not require a storage device 106 at all. Whatever the implementation, the optimization system 102, and its constituent system device(s) 104 and/or storage device (s) 106 may receive and/or transmit information via communications network 108 (e.g., the Internet) with any number of other devices, such as one or more of infrastructure components 110A-110N of a distributed system and/or one or more client devices 114. In some embodiments, the optimization system 102 may be a part of or otherwise associated with the distributed system that comprises the infrastructure components 110A-110N.

System device 104 may be implemented as one or more servers, which may or may not be physically proximate to other components of optimization system 102. Furthermore, some components of system device 104 may be physically proximate to the other components of optimization system 102 while other components are not. System device 104 may receive, process, generate, and transmit data, signals, and electronic information to facilitate the operations of the optimization system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the optimization system 102. Storage device 106 may store information relied upon during operation of the optimization system 102, such as various sensor data and/or workload data that may be used by the optimization system 102, data and documents (e.g., workload data which may include configuration files or the like) to be analyzed using the optimization system 102, or the like. In addition, storage device 106 may store control signals, device characteristics, and access credentials enabling interaction between the optimization system 102 and one or more of the infrastructure components 110A-110N or client device(s) 114.

As shown by FIG. 1, the optimization system 102 may receive data from the infrastructure components 110A-110N via the communications network 108 by way of an in-band stream. The in-band stream may comprise a standard transmission medium for interactions between these various components, such as that facilitated by the communications network 108. In some instances, the in-band streams and/or channels may be associated with a software-defined network or virtualization system utilized by the distributed system. In some embodiments, the optimization system 102 may receive data from sensors 112A-112N via the communications network 108 by way of an out-of-band stream. The out-of-band stream may comprise a dedicated communication channel between the optimization system 102 and the various sensors 112A-112N. That is, the out-of-band stream (or, in some example, streams) is separate and distinct from the in-band stream. For instance, the dedicated communication channel may be a hardwired transmission line physically connected to each of the sensors 112A-112N and the optimization system 102 (e.g., cable, fiber, or the like), a wireless transmission medium facilitated via the communication network 108 or via a separate communications network (not shown in FIG. 1), or a combination thereof (e.g., where some or all of the sensors 112A-112N are connected to a physical transmission line which, in turn, communicates wirelessly with the optimization system 102 or a communications network interposed between the optimization system 102 and the sensors 112A-112N, or where some of the sensors 112A-112N are connected to the optimization system 102 via a physical communications medium while others connect wirelessly). While in some embodiments the out-of-band stream may comprise its own dedicated communication channel, in some embodiments the out-of-band stream may utilize the same communications channel as the in-band stream (e.g., that facilitated by communications network 108), but may operate using distinct communications or encryption protocols known only to the optimization system 102, thereby enabling communication between the sensors 112A-112N and the optimization system 102 while preventing interception of such communications by other entities using the communications channel. The sensors 112A-112N may be associated with respective infrastructure components 110A-110N such that the sensors 112A-112N may be positioned to infer temperatures of the infrastructure components 110A-110N and relay sensor data comprising the inferred temperatures to the optimization system 102 via an out-of-band stream.

The one or more infrastructure components 110A-110N may be embodied by any computing devices, storage devices, network equipment, cooling devices, switching devices, and/or subcomponents thereof (e.g., power supplies, cooling equipment, etc.). Similarly, the client device(s) 114 may be embodied by any computing devices, such as desktop or laptop computers, tablet devices, smartphones, or the like. The infrastructure components 110A-110N need not themselves be independent devices, but may be peripheral devices communicatively coupled to other computing devices. In some embodiments, the infrastructure components 110A-110N may comprise edge devices.

The one or more sensors 112A-112N may be embodied by any sensors that can monitor data indicative of power consumption by corresponding infrastructure components 110A-110N. For instance, sensors 112A-112N may comprise temperature sensors (e.g., thermocouples, resistive temperature devices (RTDs), infrared sensors, bimetallic devices, thermometers, change-of-state sensors, silicon diodes, or the like), from which power consumption estimates can be drawn based on detected heat emissions from infrastructure components 110A-110N. However, the sensors 112A-112N may in some embodiments comprise current sensors that are able to measure power consumption more directly by measuring the current flowing through the corresponding infrastructure components 110A-110N.

Although FIG. 1 illustrates an environment and implementation in which the optimization system 102 interacts with one or more of infrastructure components 110A-110N, sensors 112A-112N, and/or client devices 114, in some embodiments users may directly interact with the optimization system 102 (e.g., via input/output circuitry of system device 104), in which case a separate client device 114 may not be utilized. Whether by way of direct interaction or via a separate client device 114, a user may communicate with, operate, control, modify, or otherwise interact with the optimization system 102 to perform the various functions and achieve the various benefits described herein.

Example Implementing Apparatuses

Figure 2:
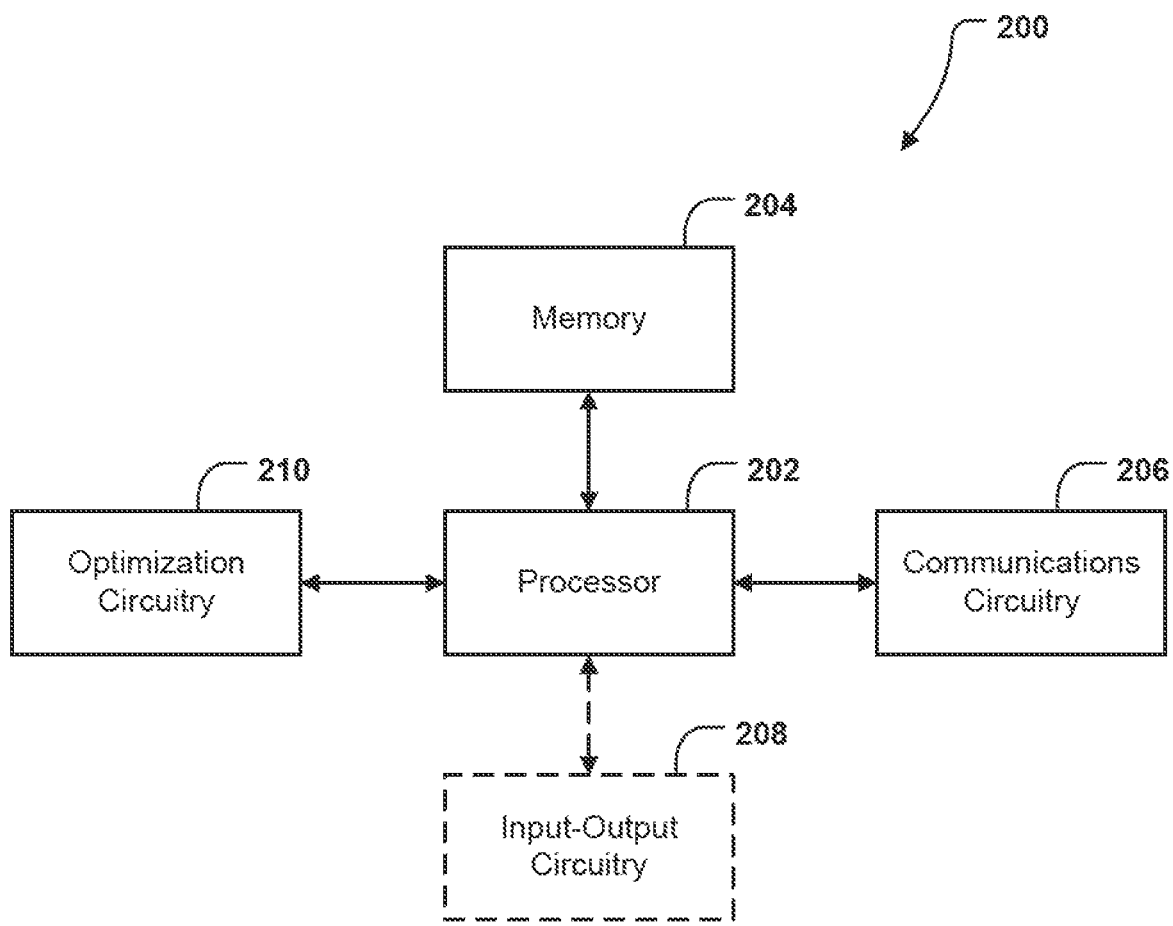
FIG. 2 illustrates a schematic block diagram of example circuitry embodying a device that may perform various operations in accordance with some example embodiments described herein.

System device 104 of the optimization system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, and optimization circuitry 210, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-4.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processor for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a client device 114 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises optimization circuitry 210 that infers power consumption rates for performing respective actions of a plurality of actions with each of the components. The optimization circuitry 210 may utilize processor 202, memory 204, or any other hardware component included in the apparatus 200 to perform these operations, as described in connection with FIGS. 3-4 below. The optimization circuitry 210 may further utilize communications circuitry 206 to gather data from a variety of sources (e.g., infrastructure components 110A-110N, sensors 112A-112N, client device(s) 114, and/or storage device 106, as shown in FIG. 1), may utilize input-output circuitry 208 to receive data from a user, and in some embodiments may utilize processor 202 and/or memory 204 to correlate workload data with sensor data. In some embodiments, the optimization circuitry 210 may leverage machine learning (ML) and/or artificial intelligence (AI) models and/or techniques to infer power consumption rates, make selections, determine suggested actions for infrastructure components, and/or other perform other processes as further discussed below.

Although components 202-210 are described in part using functional language, it will be understood that the particular implementations necessarily include the use of particular hardware. It should also be understood that certain of these components 202-210 may include similar or common hardware. For example, the optimization circuitry 210 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may, in addition to hardware, also include the hardware components of the apparatus 200 configured with software instructions to perform the various functions described herein.

Although the optimization circuitry 210 may leverage processor 202, memory 204, communications circuitry 206, or input-output circuitry 208 as described above, it will be understood that the optimization circuitry 210 may include one or more dedicated processors, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the optimization circuitry 210 is implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by the apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
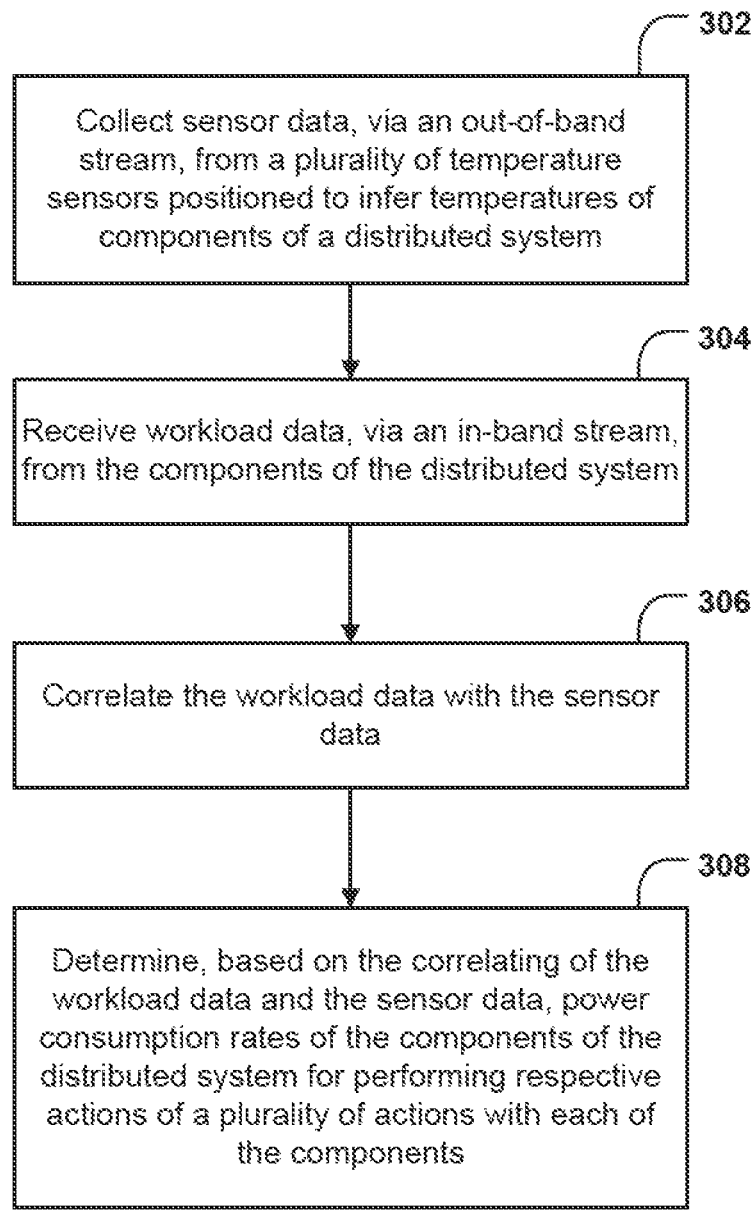
FIG. 3 illustrates an example flowchart for managing operation of a distributed system that provides computer-implemented services, in accordance with some example embodiments described herein.
Figure 4:
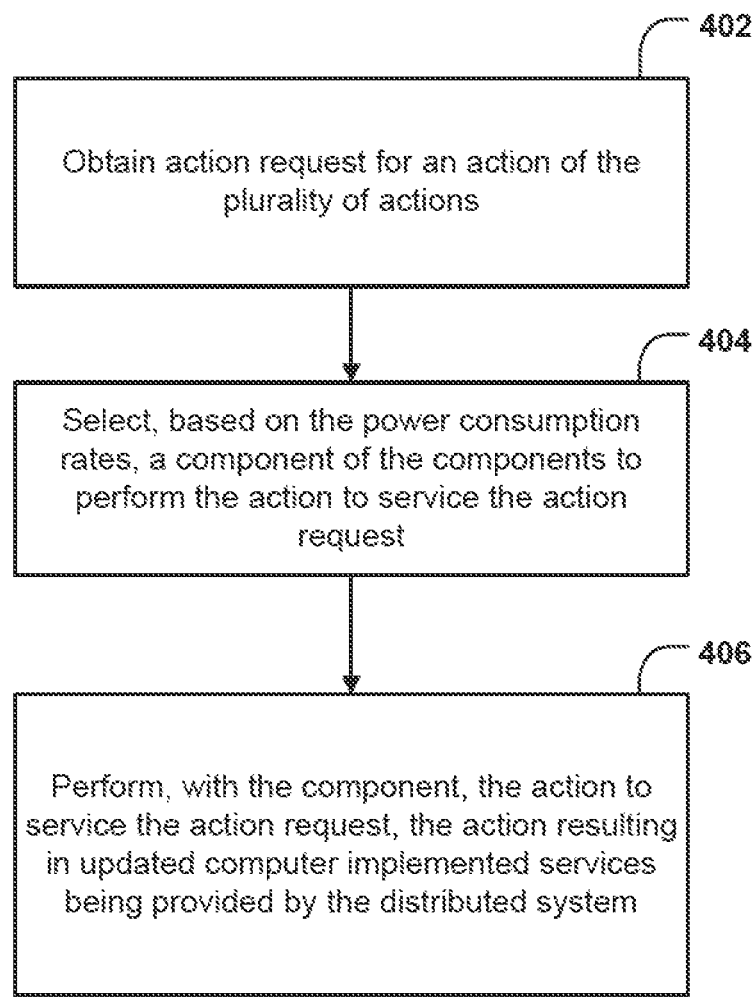
FIG. 4 illustrates an example flowchart for managing operation of a distributed system that provides computer-implemented services, in accordance with some example embodiments described herein.

Turning to FIGS. 3 and 4, example flowcharts are illustrated that contain example operations implemented by example embodiments described herein. The operations illustrated in FIGS. 3 and 4 may, for example, be performed by system device 104 of the optimization system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, optimization circuitry 210, and/or any combination thereof. It will be understood that user interaction with the optimization system 102 may occur directly via input-output circuitry 208, or may instead be facilitated by a separate client device 114, as shown in FIG. 1, and which may have similar or equivalent physical componentry facilitating such user interaction.

Turning first to FIG. 3, example operations are shown for managing operation of a distributed system that provides computer-implemented services.

As shown by operation 302, the apparatus 200 includes means, such as processor 202, memory 204, communications circuitry 206, or the like, for collecting sensor data from a plurality of sensors (e.g., sensors 112A-112N) via an out-of-band stream (or, in some examples, multiple out-of-band streams). The plurality of sensors may make up a sensor network integrated into a distributed system. The plurality of sensors may be temperature sensors positioned to infer temperatures of infrastructure components of the distributed system (e.g., infrastructure components 110A-110N). For example, a temperature sensor may be positioned directly on or near an infrastructure component, such that the collected sensor data may comprise the inferred temperature of the nearby infrastructure component. In some implementations, the sensors may capture other information regarding corresponding infrastructure components. For instance, a given sensor may comprise a current sensor positioned such that it can gather data regarding the current flowing through a given infrastructure component. In some embodiments, a sensor may be designed to measure both temperature and current of an infrastructure component, thereby permitting a more robust determination of the energy utilization of the infrastructure component, and/or facilitating evaluation of the accuracy of the sensor itself (e.g., if the power consumption determined via temperature measurement diverges from power consumption determined from current flow, then the apparatus 200 may determine that at least one of the sensor's sensor measurements is inaccurate).

As described above, the sensor data collected from the plurality of sensors may comprise other information. For example, the sensor data may comprise identifiers of one or more infrastructure components that it is monitoring, timestamps at which data (e.g., temperature or current) regarding the infrastructure components were gathered, geolocation information of one or more infrastructure components (e.g., positional coordinates, identifiers of a room and/or structure that houses the infrastructure components, etc.), information identifying a type of the sensor, etc.

In some embodiments, sensor data is continuously collected in real-time. In this regard, the optimization system 102 may always have up-to-date information regarding temperatures and/or current flow of various infrastructure components within the distributed system. In some embodiments, sensor data may be collected on-demand as a result of a request received by or input to the optimization system 102 (e.g., via communications circuitry 206 or input-output circuitry 208).

As described above, the sensor data may be received via an out-of-band stream. In some examples, transmitting data through in-band streams associated with a protocol defined by, e.g., a virtualization system may be prone to transmission delays, data corruption, and/or the like. Further, as described above, operators of public components within the distributed systems may have an economic incentive to encourage continued use of their infrastructure components, which may lead to purposely misleading and/or inaccurate energy consumption reporting (e.g., misleading temperature data). In this regard, use of an out-of-band stream and/or channel for collecting sensor data may ensure both timely collection of sensor data and avoidance of misleading temperature data.

As shown by operation 304, the apparatus 200 includes means, such as processor 202, memory 204, communications circuitry 206, or the like, for receiving workload data, via an in-band stream, from the components of the distributed system. The workload data may comprise information related to a plurality of actions as performed by the components. For example, the workload data may indicate a type of action performed by the infrastructure component, a date and time at which the action was performed by the infrastructure component, geolocation information of one or more infrastructure components, configuration data of one or more infrastructure components, and/or other information.

In some embodiments, workload data is continuously collected in real-time. In this regard, the optimization system 102 may always have up-to-date information regarding workloads performed by various infrastructure components within the distributed system. In some embodiments, workload data may be collected on-demand as a result of a request received by or input to the optimization system 102 (e.g., via communications circuitry 206 or input-output circuitry 208). For example, workload data may automatically be generated and stored during or after a workload is performed by an infrastructure component (e.g., in storage device 106, memory 204, and/or the like). In this regard, the request may comprise a request for workload data recorded over a previous time period. In some embodiments, workload data may be received directly from an infrastructure component, e.g., via an in-band stream and/or channel.

As shown by operation 306, the apparatus 200 includes means, such as processor 202, memory 204, optimization circuitry 210, or the like, for correlating the workload data with the sensor data. The workload data and sensor data may be continuously correlated as the data is obtained.

The workload data and the sensor data may be correlated in a variety of ways. In some embodiments, the workload data may comprise aggregated workload data received over a period of time, and the sensor data may comprise aggregated sensor data received over the same period of time. For example, the aggregated workload data and the aggregated sensor data may be matched together based on respective timestamps of the workload data and the sensor data. By correlating the workload data and the sensor data, an accurate view of the distributed system over time with respect to workloads and inferred operating characteristics (e.g., temperature or current flow) of infrastructure components performing the workloads may be achieved. In some embodiments, a data structure comprising the correlated data may be generated and analyzed to infer power consumption rates for performing respective actions of a plurality of actions with each of the components.

In this regard, as shown by operation 308, the apparatus 200 includes means, such as processor 202, memory 204, optimization circuitry 210, or the like, for determining, based on the correlating of the workload data and the sensor data, power consumption rates for performing respective actions of a plurality of actions with each of the components.

For example, a plurality of actions which the distributed system performs using various components may be predefined by the distributed system (e.g., processing and/or executing queries, updating databases, generating some output, etc.). Using the data structure comprising the correlated workload and sensor data, power consumption rates of various infrastructure components of the distributed system may be inferred, e.g., using statistical analysis, one or more models (e.g., machine learning models), and/or the like. In this regard, for a respective action, the data structure may be analyzed to identify times at which the action was performed at a particular infrastructure component and the corresponding inferred temperatures or current flow of the infrastructure component at that time to determine a power consumption rate for performing that action with that particular component.

The power consumption rate may be a representative value that is based on an average or other statistical parameter of the inferred temperatures or current flow at all of (or a portion of) the times at which the infrastructure component performed the action. In some embodiments, power consumption rates may be continuously re-defined and/or updated based on continuously receiving new workload and sensor data for the infrastructure components. Additional information may be gleaned from inferring the power consumption rates. For example, configuration data of the workload data may indicate that a particular infrastructure component consumes more or less power when performing a particular action after a reconfiguration of the infrastructure component (e.g., a software update, settings change, etc.). In some embodiments, power consumption rates for certain devices, such as edge devices (e.g., routers or the like) may be inferred for particular actions performed downstream from the edge device (e.g., at a next node in the distributed system).

Through correlating the sensor data and workload data of the distributed system and further establishing inferred power consumption rates for infrastructure components of the distributed system, a holistic view of the distributed system is achieved which allows effective decisions to be made with regards to how to process certain actions within the distributed system and how to manage uptime and downtime of various infrastructure components, as further detailed below.

Turning next to FIG. 4, example operations are shown for processing an action request based on inferred power consumption rates.

As shown by operation 402, the apparatus 200 includes means, such as processor 202, memory 204, communications circuitry 206, or the like, for obtaining an action request for an action of the plurality of actions.

The action request may be obtained in various ways. For example, the action request may be received from a client device 114 (e.g., via communications circuitry 206 and communications network 108). In some embodiments, the action request may be received based on input by a user to the optimization system 102 (e.g., via input-output circuitry 208). In some embodiments, the action request may be retrieved from a queue or the like (e.g., in memory 204 and/or storage device 106). In some embodiments, the action request may be received from another infrastructure component 110A-110N of the distributed system. For example, an action of the action request may be an in-band data packet transmission from one infrastructure component to another infrastructure component within the distributed system.

Regardless of how the action request is obtained, as shown by operation 404, the apparatus 200 includes means, such as processor 202, memory 204, optimization circuitry 210, or the like, for selecting, based on the inferred power consumption rates, a particular component of the components to perform the action to service the action request. The selection of the particular component may be made with a preference to minimize or otherwise reduce power consumption of the distributed system (e.g., as a whole) for performance of the action.

For example, an infrastructure component may be selected to perform the particular action of the action request based on having a lower inferred power consumption rate than inferred power consumption rates of the other infrastructure components that are also capable of performing the particular action. As power consumption rates of various infrastructure components may be inferred in real-time due to the continuous collection of sensor data and workload data, the optimization system 102 may select the component at which to perform the action at a high level of certainty of the current status of the component (e.g., a current power consumption rate). In some embodiments, selecting a component to perform an action may be performed without first obtaining an action request for the action. For example, a component may be selected automatically during an in-progress execution of an action. In this regard, an action may be re-routed from a first component to one or more other components on-the-fly based on a determination that completing the execution of the action at the first component would results in a higher power consumption rate than if the action were re-routed to the one or more other components.

In some embodiments, certain actions may require use of multiple infrastructure components within the distributed system. For example, a data packet transmission may utilize multiple devices (e.g., edge devices, servers, terminals, etc.) in that the packet may be transmitted from device to device in order to reach a selected component. In this regard, in some embodiments, the optimization system 102 may use the inferred power consumption rates of the various infrastructure components to determine an optimal transmission path for the data packet. In this regard, the apparatus includes means, such as processor 202, memory 204, optimization circuitry 210, or the like, for determining an optimal transmission path of the data packet through the distributed system to the selected component based on the workload data and the sensor data. The optimal transmission path may be determined based on various components of the transmission path having lower inferred power consumption rates. For example, in some embodiments, a plurality of transmission paths may be established, and a transmission path having a lower overall power consumption rate may be selected as the optimal transmission path.

As shown by operation 406, the apparatus 200 includes means, such as processor 202, memory 204, communications circuitry 206, or the like, for performing, with the component, the action to service the action request, the action resulting in updated computer-implemented services being provided by the distributed system. For example, the action request may be forwarded to the particular component selected to perform the action via the optimal transmission path. By doing so, overall power consumption by the distributed system is minimized.

In some embodiments, by inferring power consumption rates of various infrastructure components of the distributed system, other determinations relating to usage of one or more infrastructure components may be made by the optimization system 102. In this regard, the apparatus 200 includes means, such as processor 202, memory 204, optimization circuitry 210, or the like, for determining, based on the correlating of the workload data and the sensor data, a suggested action for at least one component of the components.

In some embodiments, a suggested action may comprise a suggestion to deactivate (e.g., shut down), restart, reconfigure, modify, relocate, and/or discontinue use (e.g., permanently disable or replace) one or more infrastructure components. For example, the correlated sensor data and workload data and the inferred power consumption rates may be analyzed to determine the suggested action. As one example, an infrastructure component may be analyzed over time to determine how effective the infrastructure component is at performing certain actions. In some embodiments, business rules may be implemented which predefine rules relating to power consumption, temperatures, configurations, and/or other parameters associated with the infrastructure components of the distributed system. For example, if an inferred power consumption of a particular infrastructure component continues to exceed a threshold over a predefined period of time as defined by a business rule, the rule may indicate that the component should be assigned a different type of workload and/or have its workload reduced. If the inferred power consumption remains above the threshold after the workload modification, it may be determined that the infrastructure component should be modified (e.g., through a reconfiguration of software and/or hardware) or replaced.

In some embodiments, the optimization system 102 may automatically execute the suggested action if possible (e.g., automatically shut down or restart a component). In this regard, the apparatus 200 includes means, such as processor 202, memory 204, communications circuitry 206, or the like, for causing transmission, by the communications circuitry, of an instruction to perform the suggested action. For example, the instruction may comprise an instruction to deactivate an infrastructure component.

In some embodiments, the optimization system 102 may provide an alert indicating the suggested action. In this regard, the apparatus 200 includes means, such as processor 202, memory 204, communications circuitry 206, or the like, for causing transmission, by the communications circuitry, of an alert indicating the suggested action. For example, the alert may be provided to a client device 114 associated with a systems engineer or other personnel responsible for maintaining the distributed system. In some embodiments, the alert may comprise an email, SMS text message, push notification, and/or the like. In some embodiments, the alert may be visually presented as a graphical user interface (GUI) via input-output circuitry 208. In some embodiments, the GUI may comprise an indication of the suggested action. In some embodiments, the GUI may comprise multiple indications of various power consumption rates of various components. The GUI may be interactive, such that a systems engineer or the like may respond to the suggested action and/or manage other components of the distributed system.

As described above, example embodiments provide methods and apparatuses that enable improved power consumption management of a distributed system. Example embodiments thus provide tools that overcome the problems faced by conventional implementations of distributed systems. By implementing an out-of-band sensor network within a distributed system, example embodiments enhance security while also eliminating the possibility of erroneous reporting techniques and/or other nefarious acts that have been unavoidable in the past. Furthermore, through the use of a dedicated sensor network as described herein, example embodiments facilitate a holistic determination of power consumption by various infrastructure components that may capture ancillary power utilization not immediately apparent from workload data alone. Moreover, by continuously generating a real-time, up-to-date holistic view of a distributed system with respect to power consumption, new functionality is unlocked that has historically not been available, such as the ability for decisions to be made to process an action request and/or manage one or more infrastructure components in near real-time.

As these examples all illustrate, example embodiments contemplated herein provide technical solutions that solve real-world problems faced during distributed system management. And while effectively managing power consumption in distributed systems has been an issue for decades, the recently exploding amount of data and device interconnectivity made available by recently emerging technology today has made this problem significantly more acute, as the demand for "greener" energy and power consumption management has grown significantly even while the complexity of distributed systems has itself increased. At the same time, the recently arising ubiquity of connected devices has unlocked new avenues to solving this problem that historically were not available, and example embodiments described herein thus represent a technical solution to these real-world problems.

FIGS. 3 and 4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    collecting, by communications circuitry, sensor data from a plurality of temperature sensors via an out-of-band stream, the plurality of temperature sensors being positioned to infer temperatures of components of a distributed system, the sensor data comprising the inferred temperatures;
    collecting, by the communications circuitry and via an in-band stream, workload data from the components of the distributed system, the workload data comprising information related to a plurality of actions as performed by the components;
    correlating, by optimization circuitry, the workload data with the sensor data; and
    determining, by the optimization circuitry and based on the correlation of the workload data with the sensor data, power consumption rates of the components of the distributed system for performing respective actions of the plurality of actions.

2. The method of claim 1, wherein the workload data comprises aggregated workload data received over a period of time, and wherein the sensor data comprises aggregated sensor data received over the period of time.

3. The method of claim 2, wherein correlating the workload data and the sensor data comprises pairing portions of the workload data and portions of the sensor data based on timestamp information of the workload data and the sensor data.

4. The method of claim 1, wherein the workload data comprises configuration data of the components, and wherein the method further comprises:
    determining, by the optimization circuitry, a configuration change of a first component as corresponding to an increase or decrease of a power consumption rate of the first component.

5. The method of claim 1, wherein the power consumption rates are determined in real-time based on a continuous collection of the workload data and the sensor data, and wherein the method further comprises:
    re-routing, by the optimization circuitry, a performance of a first action at a first component to a second component based on determined power consumption rates of the first component and the second component.

6. The method of claim 1, further comprising:
    determining, by the optimization circuitry and based on the correlation of the workload data with the sensor data, a suggested action for at least one component of the components; and
    causing transmission, by the communications circuitry, of an instruction to perform the suggested action.

7. The method of claim 6, wherein the suggested action comprises one or more of: deactivating the at least one component, restarting the at least one component, reconfiguring the at least one component, modifying the at least one component, relocating the at least one component, or discontinuing use the at least one component.

8. An apparatus comprising:
    communications circuitry configured to:
        collect sensor data from a plurality of temperature sensors via an out-of-band stream, the plurality of temperature sensors being positioned to infer temperatures of components of a distributed system, the sensor data comprising the inferred temperatures, and
        collect, via an in-band stream, workload data from the components of the distributed system, the workload data comprising information related to a plurality of actions as performed by the components; and
    optimization circuitry configured to:
        correlate the workload data with the sensor data, and
        determine, based on the correlation of the workload data with the sensor data, power consumption rates of the components of the distributed system for performing respective actions of the plurality of actions.

9. The apparatus of claim 8, wherein the workload data comprises aggregated workload data received over a period of time, and wherein the sensor data comprises aggregated sensor data received over the period of time.

10. The apparatus of claim 9, wherein correlating the workload data and the sensor data comprises pairing portions of the workload data and portions of the sensor data based on timestamp information of the workload data and the sensor data.

11. The apparatus of claim 8, wherein the workload data comprises configuration data of the components, and wherein the optimization circuitry is further configured to:
    determine a configuration change of a first component as corresponding to an increase or decrease of a power consumption rate of the first component.

12. The apparatus of claim 8, wherein the power consumption rates are determined in real-time based on a continuous collection of the workload data and the sensor data, and wherein the optimization circuitry is further configured to:
    re-route a performance of a first action at a first component to a second component based on determined power consumption rates of the first component and the second component.

13. The apparatus of claim 8,
    wherein the optimization circuitry is further configured to determine, based on the correlation of the workload data with the sensor data, a suggested action for at least one component of the components; and wherein the communications circuitry is further configured to cause transmission of an instruction to perform the suggested action.

14. The apparatus of claim 13, wherein the suggested action comprises one or more of: deactivating the at least one component, restarting the at least one component, reconfiguring the at least one component, modifying the at least one component, relocating the at least one component, or discontinuing use the at least one component.

15. A computer program product comprising at least one non-transitory computer-readable storage medium storing software instructions that, when executed, cause an apparatus to:
- collect sensor data from a plurality of temperature sensors via an out-of-band stream, the plurality of temperature sensors being positioned to infer temperatures of components of a distributed system, the sensor data comprising the inferred temperatures;
- collect, via an in-band stream, workload data from the components of the distributed system, the workload data comprising information related to a plurality of actions as performed by the components;
- correlate the workload data with the sensor data; and
- determine, based on the correlation of the workload data with the sensor data, power consumption rates of the components of the distributed system for performing respective actions of the plurality of actions.

16. The computer program product of claim 15, wherein the workload data comprises aggregated workload data received over a period of time, and wherein the sensor data comprises aggregated sensor data received over the period of time.

17. The computer program product of claim 16, wherein correlating the workload data and the sensor data comprises pairing portions of the workload data and portions of the sensor data based on timestamp information of the workload data and the sensor data.

18. The computer program product of claim 15, wherein the workload data comprises configuration data of the components, and wherein the software instructions, when executed, further cause the apparatus to:
- determine a configuration change of a first component as corresponding to an increase or decrease of a power consumption rate of the first component.

19. The computer program product of claim 15, wherein the power consumption rates are determined in real-time based on a continuous collection of the workload data and the sensor data, and wherein the software instructions, when executed, further cause the apparatus to:
- re-route a performance of a first action at a first component to a second component based on determined power consumption rates of the first component and the second component.

20. The computer program product of claim 15, wherein the software instructions, when executed, further cause the apparatus to:
- determine, based on the correlation of the workload data with the sensor data, a suggested action for at least one component of the components; and
- causing transmission of an instruction to perform the suggested action.

* * * * *